(12) United States Patent
Rafey et al.

(10) Patent No.: US 11,509,715 B2
(45) Date of Patent: Nov. 22, 2022

(54) PROACTIVE REPLICATION OF SOFTWARE CONTAINERS USING GEOGRAPHIC LOCATION AFFINITY TO PREDICTED CLUSTERS IN A DISTRIBUTED COMPUTING ENVIRONMENT

(71) Applicant: Dell Products L.P., Round Rock, TX (US)

(72) Inventors: Mohammad Rafey, Bangalore (IN); Jagatha Sai Siva Surya Lokesh Prasad, Kakinada (IN)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 17/065,659

(22) Filed: Oct. 8, 2020

(65) Prior Publication Data

US 2022/0116452 A1    Apr. 14, 2022

(51) Int. Cl.
*H04L 67/1095* (2022.01)
*H04L 67/1021* (2022.01)
(Continued)

(52) U.S. Cl.
CPC ........ *H04L 67/1095* (2013.01); *G06K 9/6215* (2013.01); *G06K 9/6223* (2013.01);
(Continued)

(58) Field of Classification Search
CPC ............. H04L 41/14–147; H04L 43/08; H04L 43/0876–0894; H04L 67/10–1097;
(Continued)

(56) References Cited

U.S. PATENT DOCUMENTS 7,783,666 B1 *  8/2010  Zhuge .................. G06F 16/122
                                                   707/783
8,719,415 B1 *  5/2014  Sirota .................... H04L 67/10
                                                   709/221
(Continued)

OTHER PUBLICATIONS

Crecana, Constantin-Cosmin, and Florin Pop. "Monitoring-based auto-scalability across hybrid clouds." Proceedings of the 33rd Annual ACM Symposium on Applied Computing. 2018. (Year: 2018).*

(Continued)

*Primary Examiner* — Mohamed A. Wasel
(74) *Attorney, Agent, or Firm* — Ryan, Mason & Lewis, LLP

(57) ABSTRACT

An apparatus comprises a processing device configured to monitor, over time intervals each comprising multiple time slices, client requests to access software container instances hosted by container host devices of a geographically-distributed software container platform, and to generate cluster pattern data comprising geographic clusters for the software container instances in each of the time slices. The processing device is also configured to predict, for a given time slice in a given subsequent time interval, formation of a geographic cluster of client requests for a given software container instance based on the cluster pattern data. The processing device is further configured to calculate network distances from the predicted geographic cluster to each of the container host devices, to select one of the container host devices based on the calculated network distances, and to proactively replicate the given software container instance in the selected container host device.

20 Claims, 17 Drawing Sheets

(51) Int. Cl.
*H04L 41/147* (2022.01)
*G06K 9/62* (2022.01)
*G06N 3/04* (2006.01)

(52) U.S. Cl.
CPC ......... *G06K 9/6256* (2013.01); *G06K 9/6272* (2013.01); *G06N 3/0445* (2013.01); *H04L 41/147* (2013.01); *H04L 67/1021* (2013.01)

(58) Field of Classification Search
CPC ............ H04L 67/1095; H04L 67/1021; G06F 3/0646–065; G06F 3/067; G06F 9/455–2009/45595; G06K 9/62–6226; G06K 9/6215; G06K 9/6223; G06K 9/6256; G06K 9/6272; G06N 3/0445
See application file for complete search history.

(56) References Cited

U.S. PATENT DOCUMENTS

| Patent/Pub No. | Date | Inventor | Class |
|---|---|---|---|
| 8,856,797 B1* | 10/2014 | Siddiqui | G06F 11/3442 718/104 |
| 8,966,027 B1* | 2/2015 | Brandwine | G06F 11/1484 709/200 |
| 9,887,931 B1* | 2/2018 | Uppal | H04L 67/10 |
| 9,887,932 B1* | 2/2018 | Uppal | H04L 43/0876 |
| 10,361,924 B2* | 7/2019 | Baughman | H04L 41/147 |
| 10,372,499 B1* | 8/2019 | Radhakrishnan | G06F 9/45533 |
| 10,785,166 B1* | 9/2020 | Rothschild | H04L 47/767 |
| 10,791,168 B1* | 9/2020 | Dilley | H04L 41/22 |
| 10,887,276 B1* | 1/2021 | Parulkar | H04L 61/609 |
| 10,965,737 B1* | 3/2021 | Parulkar | H04W 12/037 |
| 10,979,422 B1* | 4/2021 | Fenichel | H04L 63/0876 |
| 10,979,534 B1* | 4/2021 | Parulkar | H04L 67/322 |
| 11,032,164 B1* | 6/2021 | Rothschild | H04L 41/5051 |
| 11,095,534 B1* | 8/2021 | Dunsmore | H04L 41/0286 |
| 11,159,344 B1* | 10/2021 | Shevade | H04L 12/4633 |
| 11,245,636 B2* | 2/2022 | Tortosa | G06F 3/0619 |
| 11,281,969 B1* | 3/2022 | Rangapuram | G06N 7/005 |
| 2002/0173984 A1 | 11/2002 | Robertson et al. | |
| 2005/0228856 A1* | 10/2005 | Swildens | H04L 47/745 709/200 |
| 2008/0059631 A1* | 3/2008 | Bergstrom | H04L 67/28 709/224 |
| 2010/0228819 A1* | 9/2010 | Wei | H04L 67/1002 718/1 |
| 2010/0312809 A1 | 12/2010 | Calder et al. | |
| 2011/0060821 A1 | 3/2011 | Loizeaux et al. | |
| 2012/0131146 A1* | 5/2012 | Choi | H04L 67/1029 709/219 |
| 2013/0013764 A1* | 1/2013 | Li | H04N 21/2402 709/224 |
| 2013/0311555 A1* | 11/2013 | Laoutaris | H04L 12/6418 709/204 |
| 2014/0095804 A1* | 4/2014 | Lientz | H04L 67/06 711/144 |
| 2014/0101300 A1 | 4/2014 | Rosensweig et al. | |
| 2014/0195675 A1* | 7/2014 | Silver | H04L 67/02 709/224 |
| 2014/0282536 A1* | 9/2014 | Dave | G06F 9/45558 718/1 |
| 2015/0046591 A1* | 2/2015 | Zhu | H04L 67/1002 709/226 |
| 2015/0188927 A1* | 7/2015 | Santhi | H04L 41/5054 726/4 |
| 2015/0206207 A1* | 7/2015 | Narasimhan | H04L 67/1004 705/400 |
| 2015/0222723 A1* | 8/2015 | Adapalli | G06Q 10/0633 705/26.41 |
| 2015/0244769 A1* | 8/2015 | Khaimov | H04L 47/125 709/217 |
| 2015/0288619 A1* | 10/2015 | Fritsch | H04L 67/1008 709/224 |
| 2016/0142338 A1* | 5/2016 | Steinder | G06N 7/005 709/226 |
| 2016/0205519 A1* | 7/2016 | Patel | H04L 67/1031 455/518 |
| 2017/0295246 A1* | 10/2017 | Georgiou | H04L 67/34 |
| 2018/0219955 A1* | 8/2018 | Chen | H04L 67/148 |
| 2018/0270125 A1* | 9/2018 | Jain | G06F 16/00 |
| 2018/0287864 A1* | 10/2018 | Hockett | G06N 20/00 |
| 2019/0097900 A1* | 3/2019 | Rodriguez | G06F 11/301 |
| 2019/0179944 A1* | 6/2019 | Ungar | H04L 41/147 |
| 2019/0213027 A1* | 7/2019 | Bhandari | G06F 9/505 |
| 2020/0099742 A1* | 3/2020 | Puente | H04W 4/02 |
| 2020/0125389 A1* | 4/2020 | Palermo | G06F 9/45558 |
| 2020/0134421 A1* | 4/2020 | Suthar | G08B 21/182 |
| 2020/0228623 A1* | 7/2020 | Weissman | H04W 36/14 |
| 2020/0322227 A1* | 10/2020 | Janakiraman | H04L 41/12 |
| 2020/0336400 A1* | 10/2020 | Juen | H04L 67/18 |
| 2020/0364245 A1* | 11/2020 | Sinha | G06F 16/355 |
| 2020/0371846 A1* | 11/2020 | Halén | H04L 67/1023 |
| 2020/0374740 A1* | 11/2020 | So | H04L 67/10 |
| 2020/0382445 A1* | 12/2020 | Calmon | H04L 47/788 |
| 2020/0413481 A1* | 12/2020 | Shemer | H04W 80/10 |
| 2021/0055959 A1* | 2/2021 | Rehman | H04L 67/322 |
| 2021/0124603 A1* | 4/2021 | Rafey | G06N 20/00 |
| 2021/0136178 A1* | 5/2021 | Casey | G06N 20/00 |
| 2021/0144517 A1* | 5/2021 | Guim Bernat | H04L 49/70 |
| 2021/0168052 A1* | 6/2021 | Parulkar | H04L 67/289 |
| 2021/0168203 A1* | 6/2021 | Parulkar | H04L 67/1085 |
| 2021/0176613 A1* | 6/2021 | Purkayastha | H04W 4/50 |
| 2021/0194988 A1* | 6/2021 | Chaysinh | G06N 20/00 |
| 2021/0281593 A1* | 9/2021 | Liu | G06F 16/285 |
| 2021/0306412 A1* | 9/2021 | Padiyar | G06F 9/5072 |
| 2021/0337043 A1* | 10/2021 | Hall | H04W 88/182 |
| 2021/0392202 A1* | 12/2021 | Henning | H04L 67/1002 |
| 2022/0019888 A1* | 1/2022 | Aggarwal | G06F 9/542 |
| 2022/0076133 A1* | 3/2022 | Yang | G06N 3/0445 |

OTHER PUBLICATIONS

Farris, Ivan, et al. "Optimizing service replication for mobile delay-sensitive applications in 5G edge network." 2017 IEEE International Conference on Communications (ICC). IEEE, 2017. (Year: 2017).*

Rossi, Fabiana, et al. "Geo-distributed efficient deployment of containers with Kubernetes." Computer Communications 159 (2020): 161-174. (Year: 2020).*

Shen, Zhiming, et al. "Follow the sun through the clouds: Application migration for geographically shifting workloads." Proceedings of the Seventh ACM Symposium on Cloud Computing. 2016. (Year: 2016).*

Wikipedia, "Geohash," https://en.wikipedia.org/wiki/Geohash, 2019, 7 pages.

Wikipedia, "Haversine Formula," https://en.wikipedia.org/wiki/Haversine_formula, 2019, 4 pages.

Geeksforgeeks, "Haversine Formula to Find Distance between Two Points on a Sphere," https://www.geeksforgeeks.org/haversine-formula-to-find-distance-between-two-points-on-a-sphere/, 2019, 16 pages.

U.S. Appl. No. 16/662,893 filed in the name of Mohammad Rafey, filed Oct. 24, 2019, and entitled "Software Container Replication Using Geographic Location Affinity in a Distributed Computing Environment."

* cited by examiner

| DATE TIMESTAMP | CONTAINER INSTANCE IDENTIFIER | LATITUDE | LONGITUDE |
|---|---|---|---|
| 20080501T08:31:52Z | ABCDE | 29 | 34 |
| 20080501T08:31:52Z | BCDEF | 34 | 76 |
| 20080501T08:31:62Z | CDEFG | 45 | 98 |
| 20080501T08:30:52Z | DEFGH | 12 | 67 |
| 20080501T08:30:52Z | EFGHI | 45 | 45 |
| 20080501T08:30:52Z | FGHIJ | 78 | 32 |
| 20080501T08:30:52Z | GHIJK | 98 | 56 |
| 20080501T08:40:52Z | ABCDE | 65 | 44 |

```
import csv
import numpy as np
import matplotlib.pyplot as plt
from sklearn.cluster import Kmeans
from sklearn.datasets import make_blobs

# Randomly generated values are used and considered as coordinate positions here.  In actual use,
the coordinate positions will be latitude and longitude position or other actual location information.
n_samples = 1500
random_state = 150 plt.figure(figsize=(10, 10))
x, y = make_blobs(n_samples=n_samples, random_state=random_state)
x_varied, y_varied = make_blobs(n_samples=n_samples, cluster_std=[1.0, 2.5, 0.5],
random_state=random_state)
y_pred = Kmeans(n_clusters=4, random_state=random_state).fit_predict(x_varied)

plt.scatter(x_varied[:, 0], x_varied[:, 1], c=y_pred)
plt.title("K-Means Clustering based on Geographic Locations")
plt.xlabel('X = Latitude')
plt.ylabel('Y = Longitude')
plt.show()
```

```
import nvector as nv
points = nv.GeoPoint(latitude=[90,60,50], longitude=[0,10,-20], degrees=True)
nvectors = points.to.nvector()
n_vectors_mean = nvectors.mean()
n_vectors_mean_geopoint = n_vectors_mean.to_geo_point()
lat, lon = n_vectors_mean_geopoint.latitude_deg, n_vectors_mean_geopoint.longitude_deg
msg = 'Ex7: Pos M: lat, lon = {:4.2f}, {:4.2f} deg'
msg.format(lat[0], lon[0]
```

| DATE TIMESTAMP (A) | CONTAINER INSTANCE IDENTIFIER (B) | CLUSTER QUARTILE POSITION (C) (24 HOURS = 4 QUARTILES) | HOUR (D) | CLUSTER MIDPOINT LOCATION (E) |
|---|---|---|---|---|
| 20080501T08:31:52Z | ABCDE | 3 | 2 | 29,34 |
| 20080501T08:31:52Z | BCDEF | 2 | 1 | 43,26 |
| 20080501T08:31:62Z | CDEFG | 4 | 6 | 23,76 |
| 20080501T08:30:52Z | DEFGH | 1 | 13 | 87,34 |
| 20080501T08:30:52Z | EFGHI | 4 | 5 | 23,65 |
| 20080501T08:30:52Z | FGHIJ | 2 | 15 | 34,56 |
| 20080501T08:30:52Z | GHIJK | 1 | 2 | 76,43 |
| 20080501T08:40:52Z | ABCDE | 4 | 18 | 12,43 |
| 20080501T08:30:52Z | CDEFG | 2 | 12 | 76,34 |
| 20080501T08:60:52Z | DEFGH | 1 | 23 | 87,56 |
| 20080501T08:60:52Z | DEFGH | 3 | 6 | 98,56 |

```
900-1 import panda as pd
import numpy as np
from os import listdir
import matplotlib.pyplot as plt
import tensorflow as tf
from sklearn.metrics import accuracy_score
from keras.preprocessing import sequence
from keras.models import Sequential
from keras.layers import Dense
from keras.layers import LSTM
from keras.optimizers import Adam
from keras.models import load_model
from keras.callbacks import ModelCheckpoint

# 1. System collects cluster pattern data
path = 'sample-cluster-data/cluster-pattern-data-stream-'
sequences = list()
for i in range(1, 5):
    file_path = path + str(i) + '.csv'
    print(file_path)
    df = pd.read_csv(file_path, header=0)
    values = df.values
    sequences.append(values)

# 2. Prepare the training data set
targets = pd.read_csv('sample-cluster-data/cluster-pattern-data-stream-training-set-1.csv')
targets = targets.values[:, 1]
```

FIG. 9A

```
# 3. Take out a chunk of data for building training data set
train = [sequences[i] for i in range(1, 500)]
validation = [sequences[i] for i in range(1, 500)]
test = [sequences[i] for i in range(1, 500)]
train_target = [targets[i] for i in range(1, 500)]
validation_target = [targets[i] for i in range(1, 500)]
test_target = [targets[i] for i in range(1, 500)]

# 4. Build training, validation and test data sets
train = np.array(train)
validation = np.array(validation)
test = np.array(test)
train_target = np.array(train_target)
train_target = (train_target+1)/2
validation_target = np.array(validation_target)
validation_target = (validation_target+1)/2
test_target = np.array(test_target)
test_target = (test_target+1)/2

# 5. Model Training
model = Sequential()
model.add(LSTM(256, input_shape=(2000, 4)))
model.add(Dense(1, activation='sigmoid'))
adam = Adam(lr=0.01)
chk = ModelCheckpoint('best_model.pkl', monitor='val_acc', save_best_only=True, mode='max', verbose=1)
model.compile(loss='binary_crossentropy', optimizer=adam, metrics=['accuracy'])
model.fit(train, train_target, epochs=200, batch_size=128, callbacks=[chk], validation_data=(validation,validation_target))

# 6. Loading the model and executing on test data
model = load_model('best_model.pkl')
test_preds = model.predict_classes(test)
accuracy_score(test_target, test_preds)
```

FIG. 9B

```
from math import radians, cos, sin, asin, sqrt def haversine(srclatitude1, srclongitude1, dstlatitude2, dstlongitude2):
    # Earth radius in kilometers
    r = 6372.8
    dlat = radians(dstlatitude2 - srclatitude1)
    dlon = radians(dstlongitude2 - srclongitude1)
    latone = radians(srclatitude1)
    lattwo = radians(dstlatitude2)
    a = sin(dlat/2)**2 + cos(latone)*cos(lattwo)*sin(dlon/2)**2
    c = 2*asin(sqrt(a))
    return r * c

# Sample test coordinates
lat1 = 32.0004311
lon1 = -103.548851
lat2 = 33.374939
lon2 = -103.6041946 print(' ')
print('Computing Haversine Distance in KM')
print('Source Position (Lat, Long) = ' + str(lat1) + ',' + str(lon1))
print('Destination Position (Lat, Long) = ' + str(lat2) + ',' + str(lon2))
result = haversine(lat1, lon1, lat2, lon2)
print('Haversine Distance (in KMs) = ' + str(result))
```

PROACTIVE REPLICATION OF SOFTWARE CONTAINERS USING GEOGRAPHIC LOCATION AFFINITY TO PREDICTED CLUSTERS IN A DISTRIBUTED COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present invention provide techniques for proactive replication of software containers using geographic location affinity to predicted clusters in a distributed computing environment.

In one embodiment, an apparatus comprises at least one processing device comprising a processor coupled to a memory. The at least one processing device is configured to perform the step of monitoring, over one or more time intervals, client requests to access one or more software container instances each hosted by one or more of a plurality of container host devices of a geographically-distributed software container platform, each of the one or more time intervals comprising two or more time slices. The at least one processing device is also configured to perform the step of generating cluster pattern data for the one or more software container instances, the cluster pattern data comprising one or more geographic clusters of client requests for at least one of the one or more software container instances in at least one of the two or more time slices. The at least one processing device is further configured to perform the step of predicting, for a given one of the two or more time slices in a given time interval subsequent to the one or more time intervals, formation of at least one geographic cluster of client requests for at least one of the one or more software container instances based at least in part on the generated cluster pattern data. The at least one processing device is further configured to perform the steps of calculating network distances from the at least one predicted geographic cluster to each of at least a subset of the plurality of container host devices, selecting one of the subset of the plurality of container host devices based at least in part on the calculated network distances, and proactively replicating the at least one software container instance in the selected container host device prior to the given time slice of the given time interval.

These and other illustrative embodiments include, without limitation, methods, apparatus, networks, systems and processor-readable storage media.

BRIEF DESCRIPTION OF THE DRAWINGS

FIG. 3 shows a table of sample client request data in an illustrative embodiment.

FIG. 4 shows pseudocode for generating clusters in client request data using a machine learning-based clustering algorithm in an illustrative embodiment.

FIG. 6 shows pseudocode for computing cluster midpoints in an illustrative embodiment.

FIG. 7 shows a table of sample cluster pattern data in an illustrative embodiment.

FIGS. 9A and 9B show pseudocode for performing cluster formation prediction using past historical data and machine learning in an illustrative embodiment.

FIG. 11 shows pseudocode for computing network distances in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
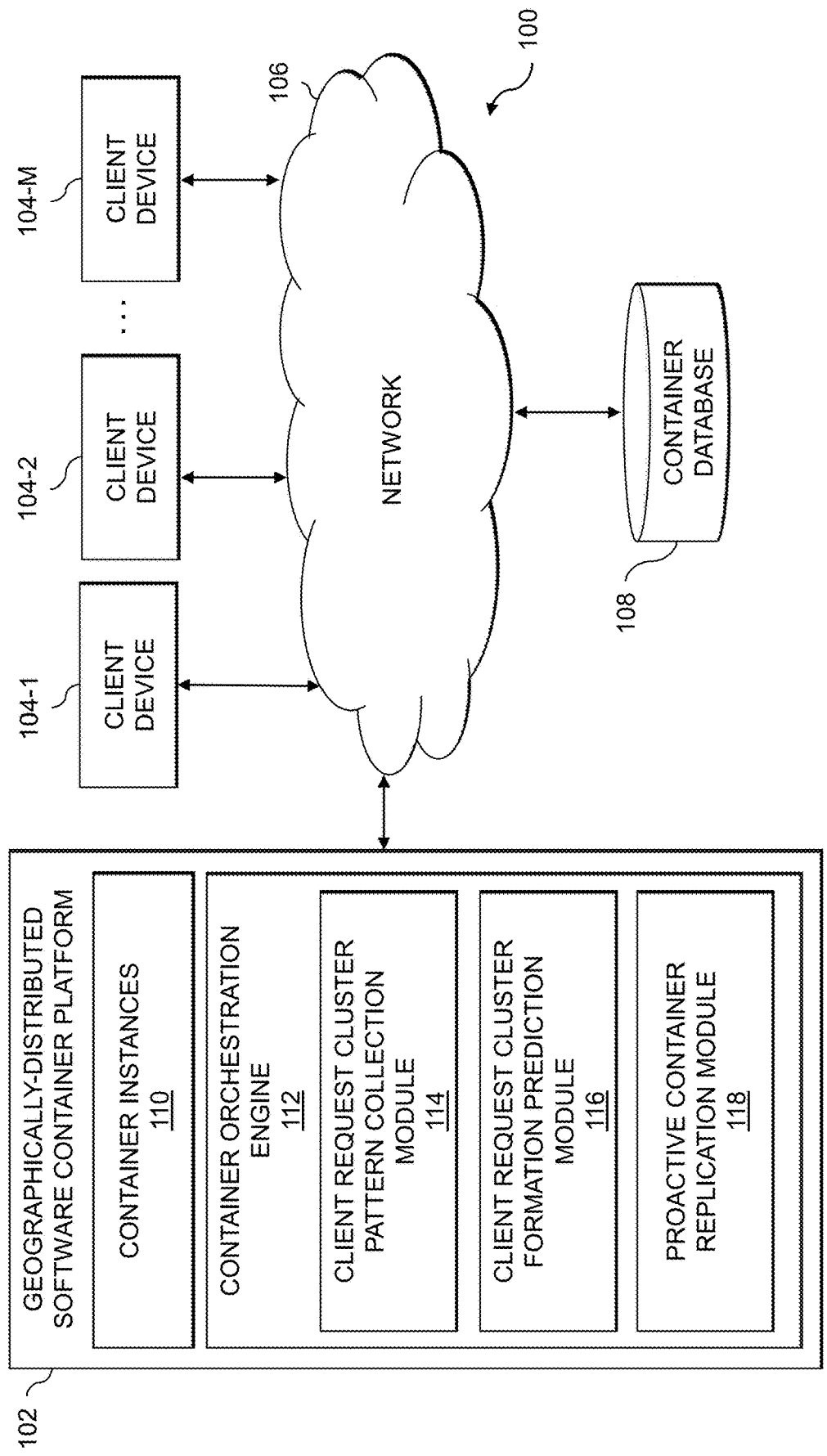
FIG. 1 is a block diagram of an information processing system for proactive replication of software containers using geographic location affinity to predicted clusters in a distributed computing environment in an illustrative embodiment of the invention.

FIG. 1 shows an information processing system 100 configured in accordance with an illustrative embodiment. The information processing system 100 is assumed to be built on at least one processing platform and provides functionality for proactive replication of software containers using geographic location affinity to predicted clusters in a distributed computing environment. The software containers, also referred to herein as containers, are assumed to be implemented by a geographically-distributed software container platform 102, also referred to herein as a cloud container platform 102 or a container platform 102. Users or clients provide requests to the container platform 102 via client devices 104-1, 104-2, . . . 104-M (collectively, client devices 104). A container orchestration engine 112 of the container platform 102 receives requests from the client devices 104 to execute or access containers, and the container platform 102 runs one or more container instances 110 as requested by the client devices 104. The container platform 102 and client devices 104 are coupled to a network 106. Also coupled to the network 106 is a container database 108, which may store various information relating to the containers and container instances 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. The container instances 110 running on the container platform 102 may be associated with a particular enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The container database 108, as discussed above, is configured to store and record information relating to containers, such as the geographic location of physical hosts on which the container instances 110 run, the geographic locations of the client devices 104 that request access to or otherwise utilize container instances 110, etc. Such information may be used to predict formation of clusters of client requests to containers, with the predicted clusters being used to proactively dynamically replicate the container instances 110 in different physical hosts to reduce latency and improve performance.

The container database 108 in some embodiments is implemented using one or more storage systems or devices associated with the container platform 102. In some embodiments, one or more of the storage systems utilized to implement the container database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the container platform 102 and the container orchestration engine 112, as well as to support communication between the container platform 102, the container orchestration engine 112 and other related systems and devices not explicitly shown.

In some embodiments, the client devices 104 may implement host agents that are configured for communication with the container orchestration engine 112. The container orchestration engine 112, as will be described in further detail below, is configured to monitor container instances 110 running on the container platform 102 and to dynamically replicate container instances 110 on different physical hosts based on predicted formation of clusters of client requests from the client devices 104 to particular ones of the container instances 110. The host agents implemented by the client devices 104 may be configured to receive notifications or alerts when particular ones of the container instances 110 are predicted to form a cluster, when particular ones of the container instances 110 are proactively replicated by the container orchestration engine 112 in response to predicted formation of a cluster of client requests, etc. In some embodiments, such notifications and alerts for a given one of the container instances 110 may be provided to a given one of the client devices 104 that requested execution of or access to the given container instance 110. In other embodiments, such notifications and alerts may alternatively or further be provided to a system administrator, information technology (IT) personnel or other users that are responsible for managing the container platform 102 or a set of container instances 110, including the given container instance 110, associated with a particular enterprise or other entity.

It should be noted that a "host agent" as this term is generally used herein may comprise an automated entity, such as a software entity running on a processing device. Accordingly, a host agent need not be a human entity.

Although shown as an element of the container platform 102 in this embodiment, the container orchestration engine 112 in other embodiments can be implemented at least in part externally to the container platform 102, for example, as a stand-alone server, set of servers or other type of system coupled to the network 106. In some embodiments, the container orchestration engine 112 may be implemented at least in part within one or more of the client devices 104.

The container orchestration engine 112 in the FIG. 1 embodiment is assumed to be implemented using at least one processing device. Each such processing device generally comprises at least one processor and an associated memory, and implements one or more functional modules for controlling certain features of the container orchestration engine 112. In the FIG. 1 embodiment, the container orchestration engine 112 comprises a client request cluster pattern collection module 114, a client request cluster formation prediction module 116, and a proactive container replication module 118.

The client request cluster pattern collection module 114 is configured to monitor requests by the client devices 104 (e.g., from applications running on the client devices 104) to access one or more of the software container instances 110 each hosted by one or more of a plurality of container host devices of the geographically-distributed software container platform 102. The monitoring may take place over one or more time intervals, each of the time intervals comprising two or more time slices. For example, each of the time intervals may comprise a day, and the two or more slices may comprise 3-hour chunks or slice of the day. Various other examples are possible. The client request cluster pattern collection module 114 is also configured to generate cluster pattern data for the software container instances 110. The cluster pattern data comprises one or more geographic clusters of client requests for at least one of the software container instances 110 in at least one of the two or more time slices.

The client request cluster formation prediction module 116 is configured to predict, for a given one of the two or more time slices in a given time interval subsequent to the one or more time intervals in which monitoring takes place (e.g., in a future time interval), formation of at least one geographic cluster of client requests for at least one of the software container instances 110 based at least in part on the generated cluster pattern data.

The proactive container replication module 118 is configured to calculate network distances from the at least one predicted geographic cluster to each of at least a subset of the plurality of container host devices and to select one of the subset of the plurality of container host devices based at least in part on the calculated network distances. The proactive container replication module 118 is also configured to proactively replicate the at least one software container instance in the selected container host device prior to the given time slice of the given time interval. Replicating the at least one software container instance in the selected container host device may comprise redirecting network traffic from at least one other container host device hosting the at least one software container instance to the selected container host device.

It should be appreciated that the modules 114, 116 and 118 may continually perform the above-described functionality. For example, as additional client requests come in, new client request cluster patterns may be identified by the client request cluster pattern collection module 114 and new predicted client request cluster formations may be generated by the client request cluster formation prediction module 116. The proactive container replication module 118 may thus perform proactive container instance replication based on the newly generated client request cluster formation predictions and re-calculated network distances to the predicted clusters.

It is to be appreciated that the particular arrangement of the container platform 102, the container orchestration engine 112, the client request cluster pattern collection module 114, the client request cluster formation prediction module 116 and the proactive container replication module 118 illustrated in the FIG. 1 embodiment is presented by way of example only, and alternative arrangements can be used in other embodiments. As discussed above, for example, the container platform 102, the container orchestration engine 112, the client request cluster pattern collection module 114, the client request cluster formation prediction module 116 and the proactive container replication module 118 may in some embodiments be implemented internal to one or more of the client devices 104. As another example, the functionality associated with the client request cluster pattern collection module 114, the client request cluster formation prediction module 116 and the proactive container replication module 118 may be combined into one module, or separated across more than three modules with the multiple modules possibly being implemented with multiple distinct processors or processing devices.

At least portions of the client request cluster pattern collection module 114, the client request cluster formation prediction module 116 and the proactive container replication module 118 may be implemented at least in part in the form of software that is stored in memory and executed by a processor.

It is to be understood that the particular set of elements shown in FIG. 1 for proactive replication of software containers using geographic location affinity to predicted clusters in a distributed computing environment is presented by way of illustrative example only, and in other embodiments additional or alternative elements may be used. Thus, another embodiment may include additional or alternative systems, devices and other network entities, as well as different arrangements of modules and other components.

By way of example, in other embodiments, the container orchestration engine 112 may be implemented external to container platform 102, such that the container platform 102 can be eliminated. For example, container instances 110 may run on respective ones of the client devices 104, with the container orchestration engine 112 managing such container instances running on the client devices 104 rather than on a separate container platform 102.

The container platform 102, including the container orchestration engine 112, and other portions of the system 100 may be part of cloud infrastructure as will be described in further detail below.

The container orchestration engine 112 and other components of the container platform 102 and information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 104 and container platform 102 or components thereof (e.g., the client request cluster pattern collection module 114, the client request cluster formation prediction module 116 and the proactive container replication module 118) may be implemented on respective distinct processing platforms, although numerous other arrangements are possible. For example, in some embodiments at least portions of the container orchestration engine 112 and one or more of the client devices 104 are implemented on the same processing platform. A given client device (e.g., 104-1) can therefore be implemented at least in part within at least one processing platform that implements at least a portion of the container orchestration engine 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the container platform 102, client devices 104 and container database 108, or portions or components thereof, to reside in different data centers. Numerous other distributed implementations are possible. The container platform 102, or portions thereof such as the container orchestration engine 112 can also be implemented in a distributed manner across multiple data centers.

Additional examples of processing platforms utilized to implement the container orchestration engine 112 and other portions of the system 100 in illustrative embodiments will be described in more detail below in conjunction with FIGS. 12 and 13.

It is to be appreciated that these and other features of illustrative embodiments are presented by way of example only, and should not be construed as limiting in any way.

An exemplary process for proactive replication of software containers using geographic location affinity to predicted clusters in a distributed computing environment will now be described in more detail with reference to the flow diagram of FIG. 2. It is to be understood that this particular process is only an example, and that additional or alternative processes for proactive replication of software containers using geographic location affinity to predicted clusters in a distributed computing environment may be used in other embodiments.

In this embodiment, the process includes steps 200 through 210. These steps are assumed to be performed by the container orchestration engine 112 utilizing the client request cluster pattern collection module 114, the client request cluster formation prediction module 116 and the proactive container replication module 118. The process begins with step 200, monitoring, over one or more time intervals, client requests to access one or more software container instances each hosted by one or more of a plurality of container host devices of a geographically-distributed software container platform, each of the one or more time intervals comprising two or more time slices. The geographically-distributed container platform may comprise a cloud computing platform. Step 200 may comprise, for a given client request, obtaining a timestamp of the given client request, a container instance identifier, and a latitude and longitude of a geographic location of a source application providing the given client request.

In step 202, cluster pattern data is generated for the one or more software container instances. The cluster pattern data comprises one or more geographic clusters of client requests for at least one of the one or more software container instances in at least one of the two or more time slices. Step 202 may comprise, for a given one of the one or more geographic clusters associated with a given one of the one or more container instances: an identifier of a given one of the one or more time intervals; a container instance identifier of the given container instance; an identifier of a given one of the two or more time slices; and a geographic location of the given geographic cluster. The geographic location of the given cluster may comprise a cluster mid-point location. Step 202 may comprise identifying the one or more geographic clusters utilizing a machine learning clustering algorithm, such as a K-means clustering algorithm, a mini-batch K-means clustering algorithm, a hierarchical clustering algorithm, a density-based spatial clustering of application with noise (DBSCAN) algorithm, a mean shift clustering algorithm, etc.

Figure 2:
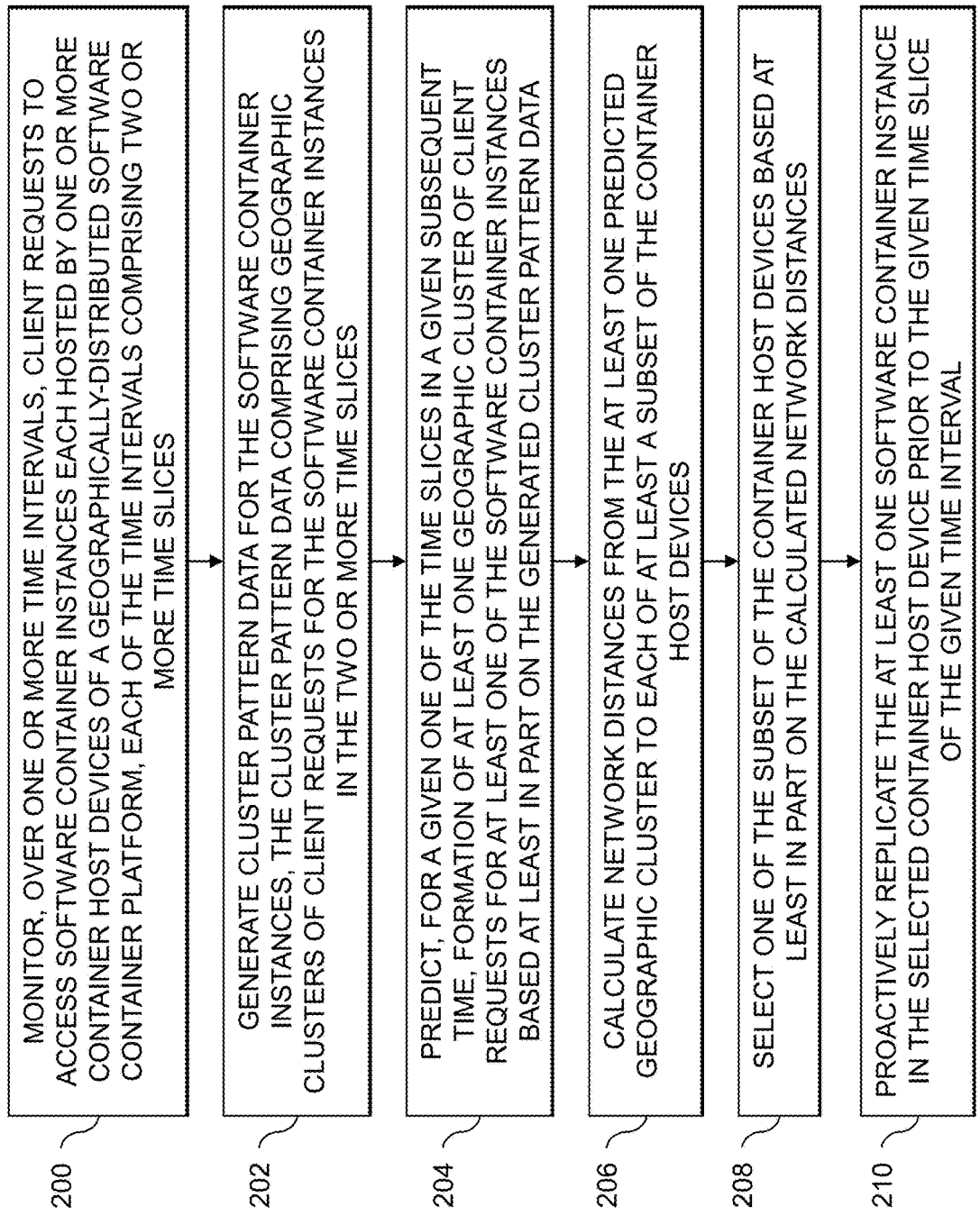
FIG. 2 is a flow diagram of an exemplary process for proactive replication of software containers using geographic location affinity to predicted clusters in a distributed computing environment in an illustrative embodiment.

The FIG. 2 process continues with step 204, predicting, for a given one of the two or more time slices in a given time interval subsequent to the one or more time intervals, formation of at least one geographic cluster of client requests for at least one of the one or more software container instances based at least in part on the generated cluster pattern data. Step 204 may comprise utilizing a machine learning algorithm, such as a long short term memory (LSTM) neural network model trained utilizing the generated cluster pattern data.

Network distances from the at least one predicted geographic cluster to each of at least a subset of the plurality of container host devices are calculated in step 206. The calculated network distances may be based at least in part on geographic distances between the predicted geographic cluster and each of the subset of the plurality of container host devices. The calculated network distance may also or alternatively be based at least in part on predictions of available network bandwidth and network latency between the predicted geographic cluster and each of the subset of the plurality of container host devices for the given time slice of the given time interval. Step 206 may comprise utilizing a Haversine distance computation algorithm. One of the subset of the plurality of container host devices is selected in step 208 based at least in part on the calculated network distances. In step 210, the at least one software container instance is proactively replicated in the selected container host device prior to the given time slice of the given time interval. Step 210 may include redirecting network traffic from at least one other container host device hosting the at least one software container instance to the selected container host device.

Container provisioning and placement on container host devices, which may include virtual and physical hosts, is a classical optimization problem. Various approaches may be implemented by cloud computing platforms to handle this problem, including approaches based on proprietary techniques, heuristics-based techniques, etc. For example, one approach for container provisioning and placement is based on utilization factors of the container host devices. Such an approach considers the optimization problem as reducing the percentage idle time for the container host devices, and increasing the percentage utilization time of the physical and/or virtual hosts providing the container host devices. Another approach is to follow some hybrid heuristic algorithm based on a fitness function (e.g., best fit, max fit, etc.) using multiple predefined criteria. Yet another approach is to determine the most appropriate container host device on which to place a given container based on some predefined constraints such as central processing unit (CPU) or memory availability. In some cases, a cloud computing platform provide functionality for manual container placement according to labels, metadata, etc.

The above approaches can be effective and useful in their own right, and may prove useful for complex cloud-hosted container-based microservices applications ecosystems. However, such approaches suffer from various drawbacks. For example, such approaches may require some form of manual planning and intervention in determining container placement strategy using a particular cloud computing platform. Further, a given cloud computing platform may not have intelligent and autonomous capability for dynamically handling container location affinity with respect to geolocation origin of client requests. Such approaches may also fail to anticipate traffic patterns and adapt autonomously on-the-fly based on service call origin and traffic cluster patterns. Further, such approaches are typically limited in their ability to consider client request affinity (e.g., such consideration is limited to container-to-container affinity within a common shared physical container host device).

Illustrative embodiments provide a novel solution which intelligently monitors and learns container application traffic patterns to identify clusters of client requests based on their associated geolocation origin. Using past historical data traffic and cluster formation pattern learnings, the solutions described herein are able to anticipate and predict future cluster formations. Based on predictions of future cluster formations, the solutions described herein proactively calculate network physical distances among those clusters and available container host devices. Using such information, the solutions described herein predictively and autonomously replicate containers in the container host devices which are geographically closer to the predicted request clusters. Advantageously, some embodiments operate in a self-optimization and self-healing way using machine learning and location computing algorithms. The objective is to reduce the physical distance between containers and respective client consumer applications as much as possible to reduce network latency and improve bandwidth utilization.

In some embodiments, the solution includes three main steps or phases: (1) understanding cluster formation patterns in client request location data; (2) anticipatory prediction of cluster formation; and (3) proactive container replication and positioning.

In the first phase, understanding cluster formation patterns in client request location data, client request geolocation data for each of a set of container instances is collected. FIG. 3 shows a table 300 illustrating example information that is collected. The table 300 includes columns for a date timestamp, a container instance identifier (ID), latitude, and longitude. This collected information, which is in the form of a continuous dataset, is then divided into slices according to a configurable time interval (e.g., daily, hourly, a custom configuration such as every 3 hours, every 6 hours, every 12 hours, etc.). Cluster analysis is then performed for each slice to detect possible cluster formation using machine learning-based clustering algorithms.

The choice of a machine learning-based clustering algorithm for a particular implementation may be based on multiple factors. For example, the choice of clustering algorithm may be based on factors such as the size of the dataset, per unit computation restrictions (e.g., per unit computation should not grow exponentially), handling of centroid based outlier distortions seamlessly, not requiring a decision on the number of clusters in advance, etc. In some embodiments, a K-means clustering algorithm is utilized, but it should be appreciated that this is just an example and that various other types of machine learning-based clustering algorithms may be used in other embodiments.

Figure 5:
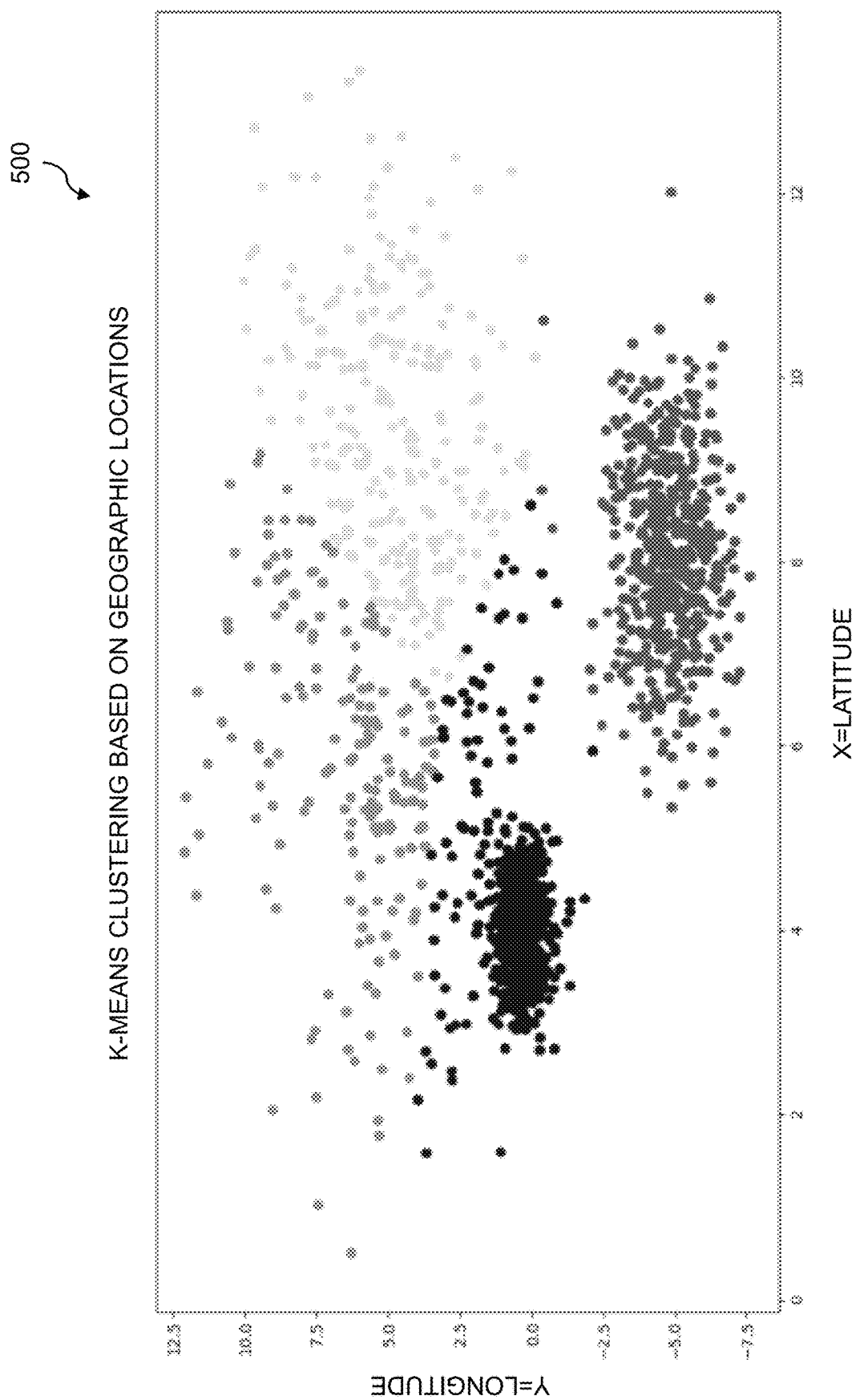
FIG. 5 shows a plot of clusters in client request data in an illustrative embodiment.

FIG. 4 shows pseudocode 400 for detecting clusters among sample client requests using a K-means clustering algorithm, and FIG. 5 shows a plot 500 of clusters of sample client requests produced by running the pseudocode 400. Once the clusters are determined, an approximate midpoint of each of the clusters is computed. FIG. 6 shows pseudocode 600 for computing the midpoint of coordinates of clusters using a Python "nvector" package. It should be noted that various techniques for computing the geographic midpoint using coordinate geometry may be used.

Next, cluster pattern data series are generated. In some embodiments, continuous cluster analysis is performed for incoming data slices in real time to detect any cluster formation in the series. The following data pattern may be used to represent cluster formation instances: date timestamp; container instance ID; cluster quartile position; hour; and cluster midpoint location. The date timestamp field indicates that date and time captured for a data series. The container instance ID field identifies the container instance for which data is being collected and an anticipatory prediction will be made. The container instance ID may be at the container type level, depending on the application scenario. The cluster quartile position field denotes in which quadrant of an applicable time space (e.g., a 24 hour time space) that clusters are detected. The cluster quartile positions are used as a prediction determinant for planning when proactive replication of container instances should be executed in the time space (e.g., within a 24 hour time frame) if the system decides to do so. The hour field denotes the hour in which a cluster is detected, and the cluster midpoint location field denotes the geographical midpoint of the cluster coordinates. The cluster midpoint location is used as a reference point to compute an appropriate distance between a cluster and possible nearest candidate container host devices for container replication. FIG. 7 shows a table 700 of the cluster pattern data collection.

Figure 8A:
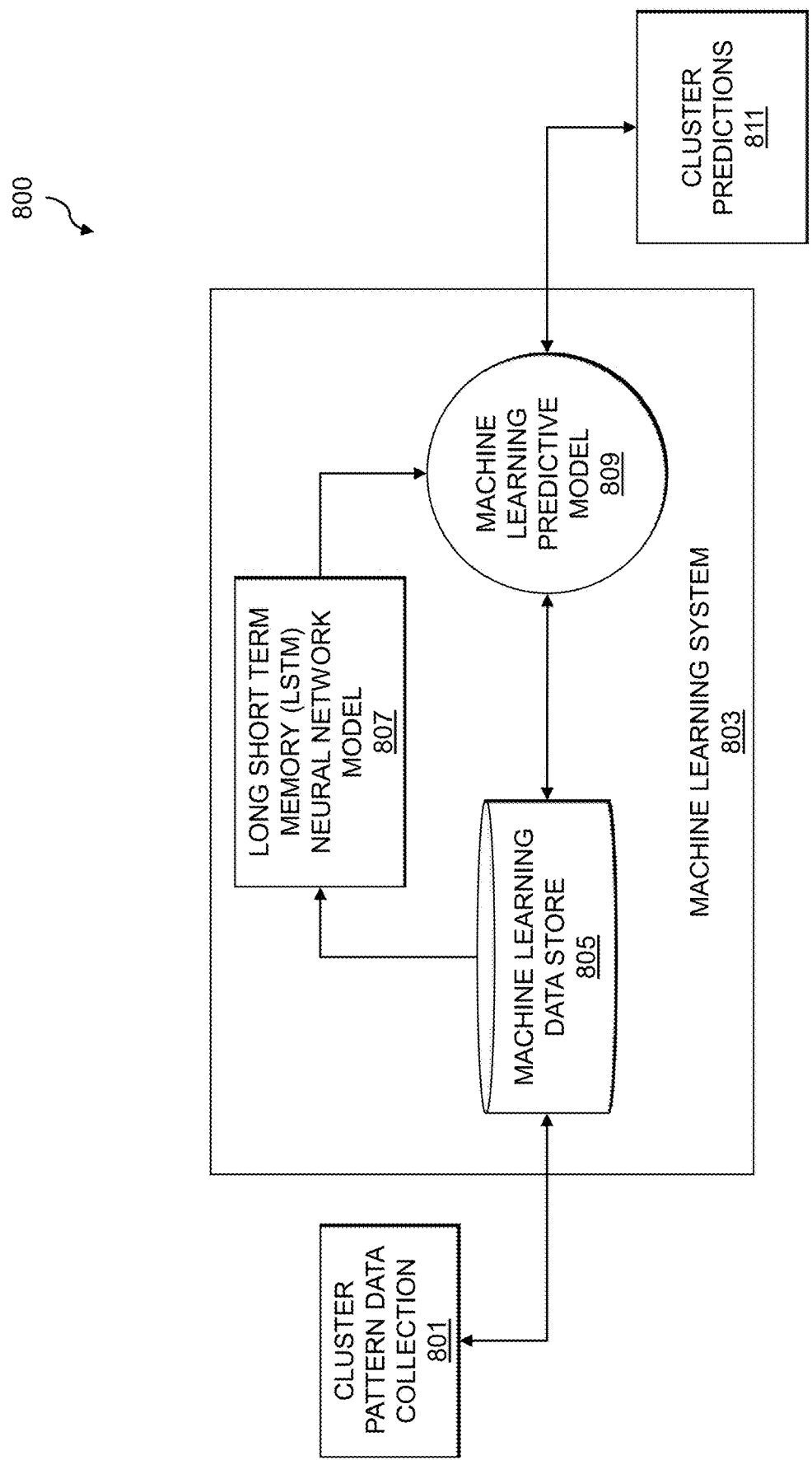
FIGS. 8A and 8B show a machine learning system for anticipatory prediction of cluster formation in an illustrative embodiment.

In the second phase, anticipatory prediction of cluster formation is performed. FIG. 8A shows a system 800 configured to perform cluster formation prediction using past historical data and machine learning. The system 800 includes cluster pattern data collection 801, with such data being provided to a machine learning system 803 for storage in machine learning data store 805. The machine learning data store 805 provides portions of the cluster pattern data as input to a long short term memory (LSTM) neural network model 807, which provides as output class prediction values to machine learning predictive model 809. The machine learning predictive model 809 utilizes the output of the LSTM neural network model 807 to generate cluster predictions 811 which are used by a container orchestration engine (e.g., container orchestration engine 112 in FIG. 1) to perform proactive container replication.

Figure 8B:
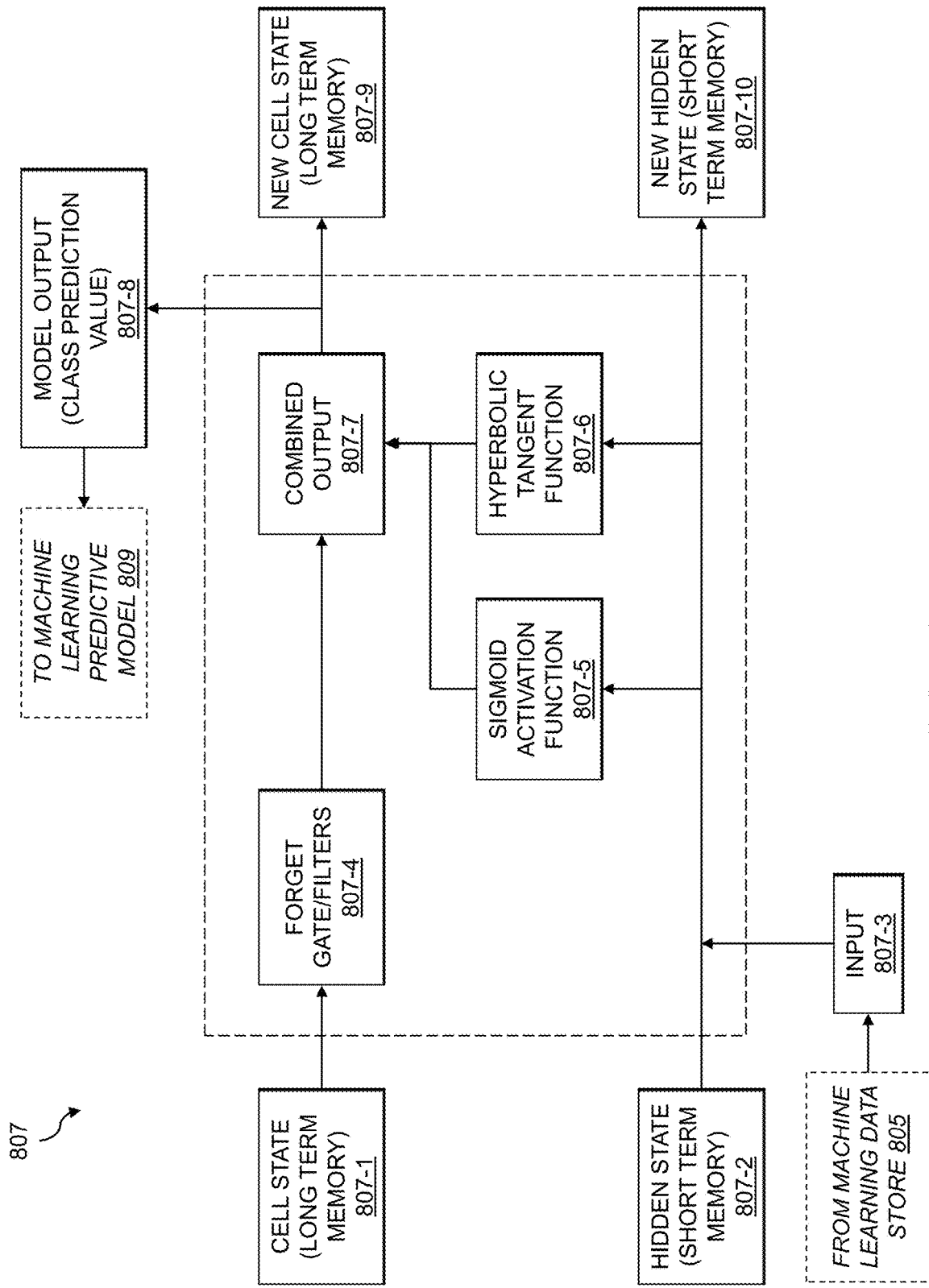

FIG. 8B shows details of an example implementation of the LSTM neural network model 807. In the FIG. 8B example, the LSTM neural network model 807 includes a cell state 807-1 providing long term memory and a hidden state 807-2 providing short term memory. Input 807-3 is applied to the hidden state 807-2, while a forget gate and/or filters are applied to the cell state 807-1. The hidden state 807-2 and input 807-3 are applied to a sigmoid activation function 807-5 and a hyperbolic tangent (TanH) function 807-6. Outputs of the forget gate 807-4, the sigmoid activation function 807-5 and TanH function 807-6 provide a combined output 807-7 which is used to generate the model output 807-8 in the form of a class prediction value that is provided to the machine learning predictive model 809. The combined output 807-7 is also used to generate a new cell state 807-9. The result of combination of the hidden state 807-2 and the input 807-3 produces a new hidden state 807-10. FIGS. 9A and 9B show pseudocode 900-1 and 900-2 (collectively, pseudocode 900) for performing cluster formation prediction using past historical data and an LSTM algorithm such as the LSTM neural network model 807.

In the third phase, proactive container replication is performed to position container instances on the nearest container host device. Once a container platform (e.g., the container orchestration engine 112 in FIG. 1) receives anticipatory cluster formation predictions for a specific container instance or container instance type, the container platform determines the nearest available container host device (e.g., in a data center, in an IT infrastructure, etc.) by computing the physical distances between potential container host devices and the midpoint of a given predicted cluster formation. The potential container host devices, also referred to herein as candidate container host devices, may comprise physical machines or servers, virtual machines, a datacenter, etc. The candidate container host device which is found to be nearest to the midpoint of the given predicted cluster formation is chosen as the replication container host device and the container platform will provision a new instance of the container in that location.

Figure 10A:
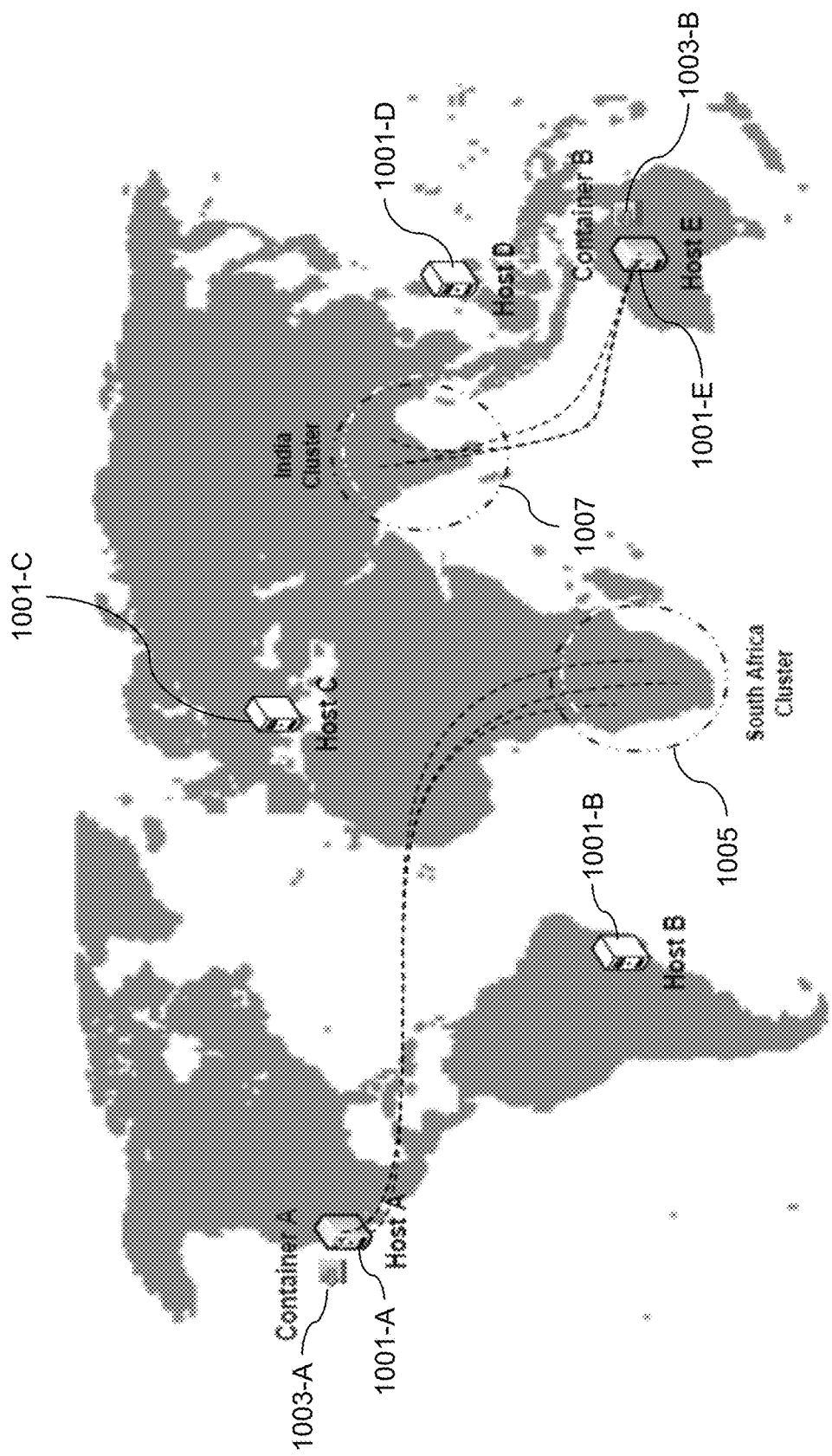
FIGS. 10A-10C illustrate dynamic container replication based on predicted cluster formations in an illustrative embodiment.
Figure 10B:
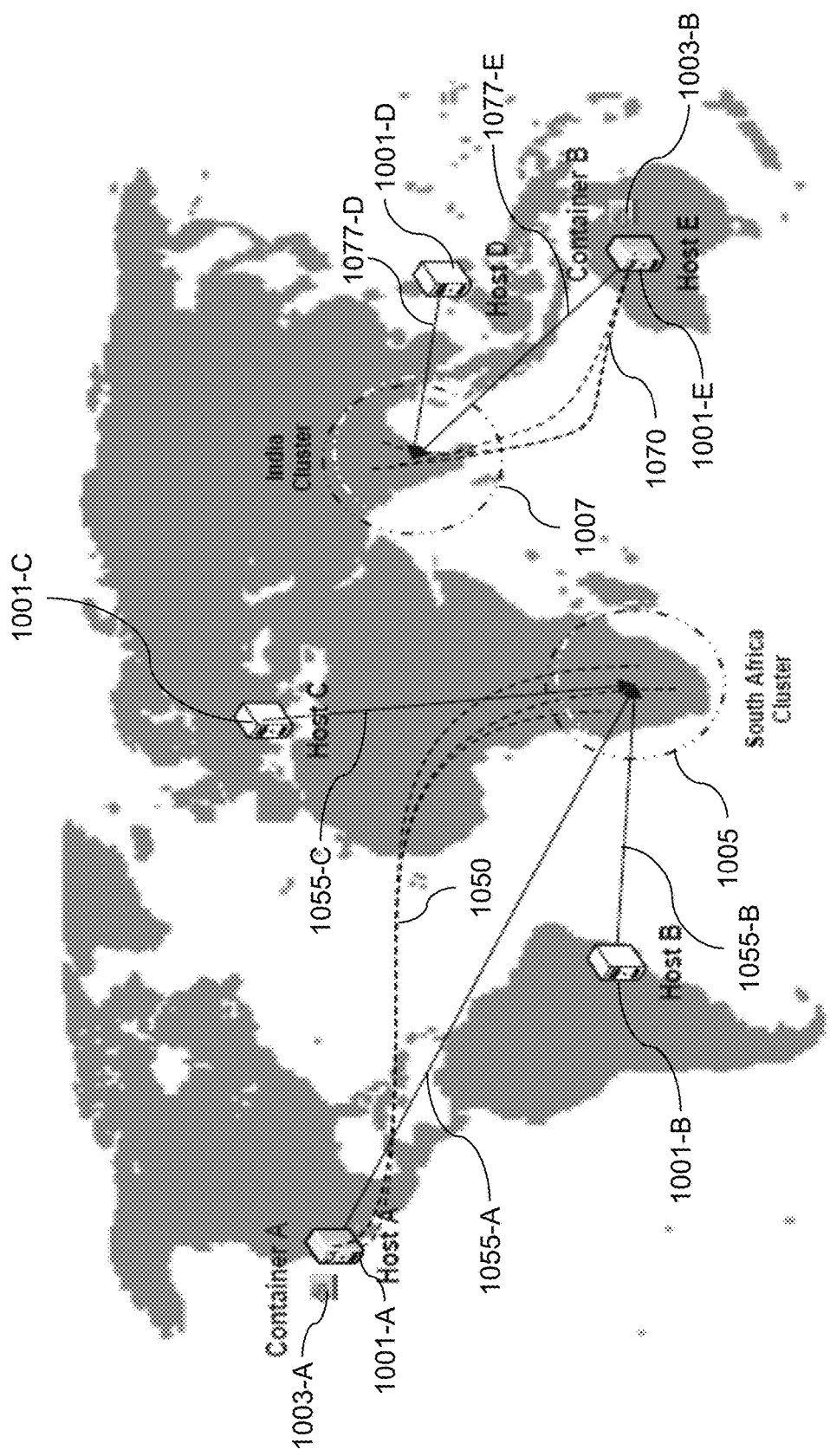
Figure 10C:
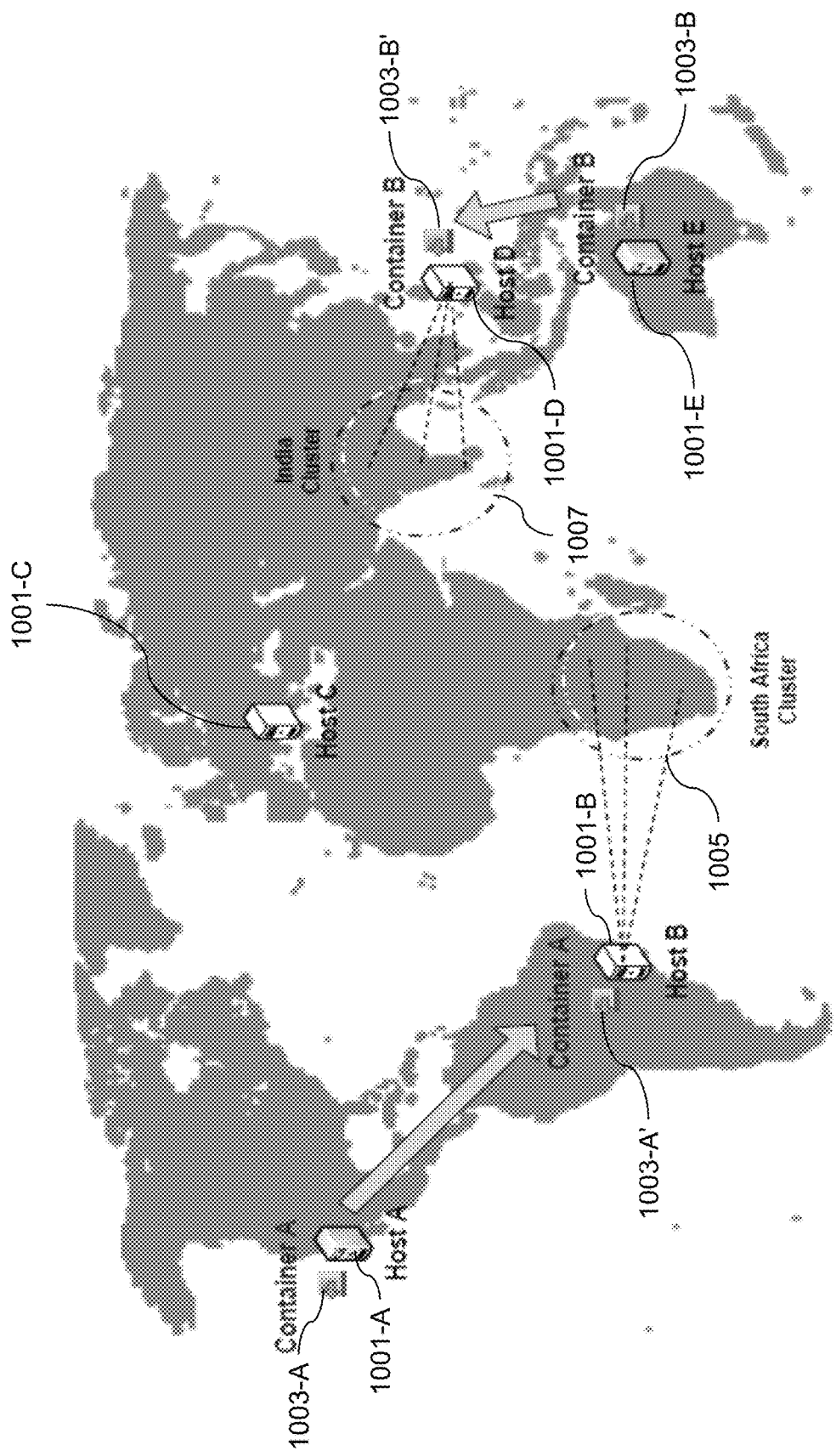

FIGS. 10A-10C illustrate cluster formation prediction and proactive container replication performed in response thereto. FIGS. 10A-10C show container host devices 1001-A through 1001-E (collectively, container host devices 1001) that are geographically distributed across the globe. Container host device 1001-A is located in California, container host device 1001-B is located in Brazil, container host device 1001-C is located in Italy, container host device 1001-D is located in the Philippines, and container host device 1001-E is located in Australia. The container host devices 1001 provide an example of a geographically-distributed computing environment. FIG. 10A shows a first container instance 1003-A currently hosted by container host 1001-A and a second container instance 1003-B currently hosted by container host 1001-E. The container instance 1003-A is associated with a predicted cluster formation 1005 in South Africa for a first designated time period, and the container instance 1003-B is associated with a predicted cluster formation 1007 in India for a second designated time period. It should be noted that the predicted cluster formation 1005 and 1007 may be associated with the same or different designated time periods. For example, the first designated time period associated with the predicted cluster formation 1005 in South Africa for container instance 1003-A may be the same as the second designated time period associated with the predicted cluster formation 1007 in India for container instance 1003-B (e.g., midday, such as at 12:00 PM). As another example, the first designated time period associated with the predicted cluster formation 1005 in South Africa for container instance 1003-A may be different than the second designated time period the predicted cluster formation 1007 in India for container instance 1003-B (e.g., the first designated time period may be early morning such as 7:00 AM while the second designated time period is late afternoon such as 4:00 PM). Proactive container replication for container instances 1003-A and 1003-B is illustratively performed prior to the first and second designated time periods. The predicted cluster formations 1005 and 1007 may be generated utilizing the machine learning system 803 of the system 800 described above.

FIG. 10B shows computation of network distance between the predicted cluster formations 1005 and 1007 and the physical container host devices 1001. A container platform (e.g., the container orchestration engine 112 in FIG. 1) considers available container host devices 1001 spread across geolocations, and calculates each of the predicted cluster formations 1005 and 1007 distance from each of at least a subset of the available container host devices 1001. As described above, such network distance computations may utilize a Haversine formula or algorithm to calculate the network distances based on latitude and longitude (e.g., from a midpoint of each of the predicted cluster formations 1005 and 1007). It should be appreciated, however, that in other embodiments other types of network distance metrics may be utilized, including metrics which take into account factors such as available bandwidth and network latency in addition to or in place of physical distance.

In FIG. 10B, predicted network traffic between the container instance 1003-A at container host 1001-A and the predicted cluster formation 1005 is shown as dashed lines 1050, while predicted network traffic between the container instance 1003-B at container host 1001-E and the predicted cluster formation 1007 is shown as dashed lines 1070. Network distances 1055-A, 1055-B and 1055-C (collectively, network distances 1055) are computed from the predicted cluster formation 1005 to the container host devices 1001-A, 1001-B and 1001-C, respectively. Network distances 1077-D and 1077-E (collectively, network distances 1077) are computed from the predicted cluster formation 1007 to the container host devices 1001-D and 1001-E, respectively. Although not shown, it should be appreciated that the network distance between predicted cluster formation 1005 and one or both of container host devices 1001-D and 1001-E may be calculated in addition to or in place of one or more of the network distances 1055. Similarly, the network distance between predicted cluster formation 1007 and one or more of container host devices 1001-A, 1001-B and 1001-C may be calculated in addition to or in place of one or more of the network distances 1077. Using the computed network distances 1055, it is determined that the container host device 1001-B is the closest container host device to the predicted cluster formation 1005. Using the computed network distances 1077, it is determined that the container host device 1001-D is the closest container host device to the predicted cluster formation 1007.

FIG. 10C illustrates autonomous proactive replication of the container instances 1003-A and 1003-B (collectively, container instances 1003) based on the predicted cluster formations 1005 and 1007, respectively. As noted above, the proactive replication of the container instances 1003-A and 1003-B may take place at the same time or at different times depending on when their associated cluster formations 1005 and 1007 are predicted to form (e.g., the first and second designated time periods associated with the predicted cluster formations 1005 and 1007). The container platform (e.g., the container orchestration engine 112 of FIG. 1) will dynamically and autonomously replicate container instances 1003 from source ones of the container host devices 1001 to target ones of the container host devices 1001 if the network distance from the latter is shorter than the former. In some embodiments, the replication is only initiated if the network distance is shorter by at least some designated threshold, so as to avoid replicating container instances between geographically close container hosts where the improvement is only marginal. The designated threshold may be determined as a minimum network distance. The network distances may be measured from the center of each of the geographical clusters.

In the FIG. 10C example, for the predicted cluster formation 1005 the network distance 1055-B is determined to be the shortest among the network distances 1055, and thus the container instance 1003-A is proactively replicated in container host device 1001-B prior to the first designated time period as container instance 1003-A'. For the predicted cluster formation 1007, the network distance 1077-D is determined to be the shortest among the network distances 1077, and thus the container instance 1003-B is proactively replicated in container host device 1001-D prior to the second designated time period as container instance 1003-B'. After such replication, client traffic is routed to the new replicas 1003-A' and 1003-B' in container host devices 1001-B and 1001-D, respectively. It should be noted that dynamically replicating a particular container instance "prior to" an associated designated time period of predicted cluster formation may include performing such replication at the start of or otherwise in conjunction with a predicted shift in traffic associated with predicted cluster formation.

As noted above, in some embodiments the network distances may be calculated using a Haversine algorithm. FIG. 11 shows pseudocode 1100 for implementing the Haversine algorithm for calculating network distances. It should be appreciated, however, that this is just an example and that other types of code may be used to calculate network distances using the Haversine or another algorithm. For example, the Python package called "geo-py" may also be used to calculate network distances.

Illustrative embodiments advantageously provide an intelligent and autonomous system which predictively anticipates client request cluster formation for container instances in specific areas and proactively replicates container instances in container host devices which are geographically nearest to the anticipated client request clusters. This predictive, dynamic and self-optimizing behavior provides various advantages relative to conventional approaches, which are typically static in nature and require some form of manual intervention. The solution described herein identifies geographical cluster formation patterns of container client requests based on geolocation origins using machine learning-based clustering techniques. Historical data is used to train a deep learning predictive model to anticipate future cluster formations. Based on the predictions, the nearest available container host device is determined using network distance measurements. Container instances are then proactively, dynamically and autonomously replicated in the container host devices that are geographically closer to the clients based on the predicted cluster formations and live traffic flow patterns.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for proactive replication of software containers using geographic location affinity to predicted clusters in a distributed computing environment will now be described in greater detail with reference to FIGS. 12 and 13. Although described in the context of system 100, these platforms may also be used to implement at least portions of other information processing systems in other embodiments.

Figure 12:
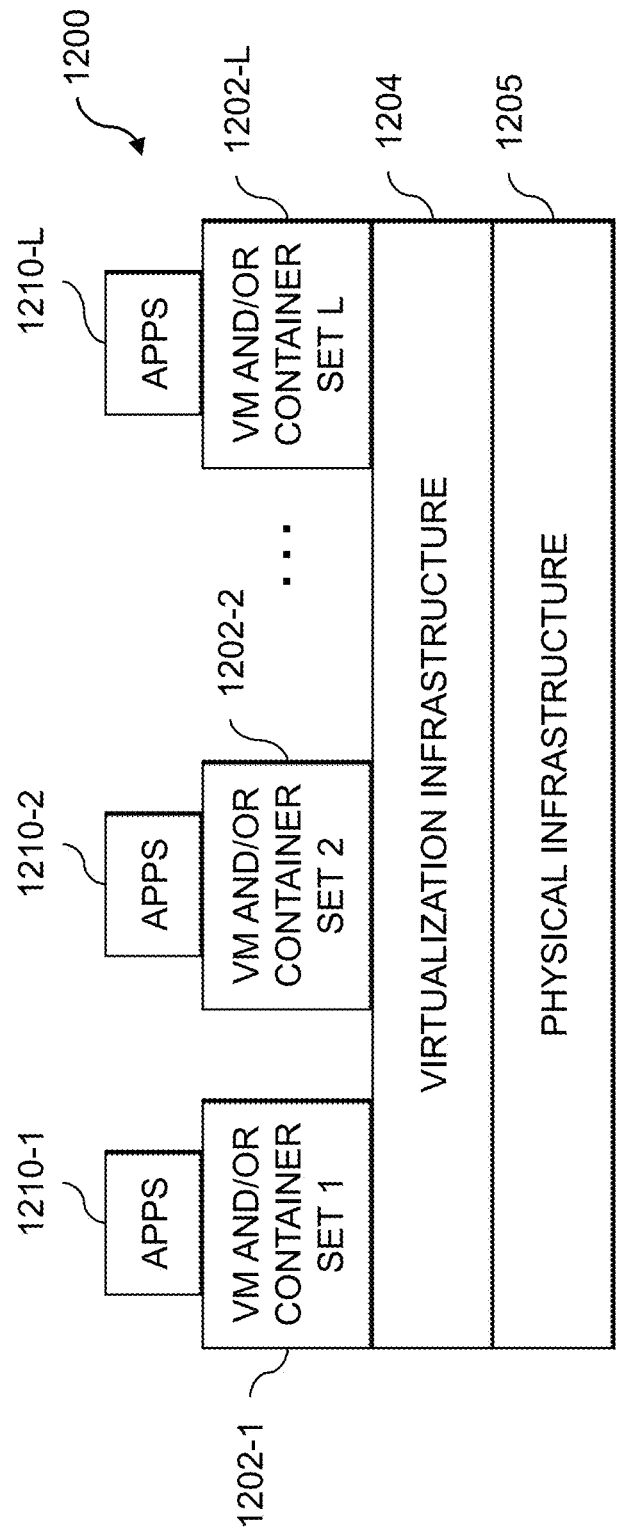
FIGS. 12 and 13 show examples of processing platforms that may be utilized to implement at least a portion of an information processing system in illustrative embodiments.
Figure 13:
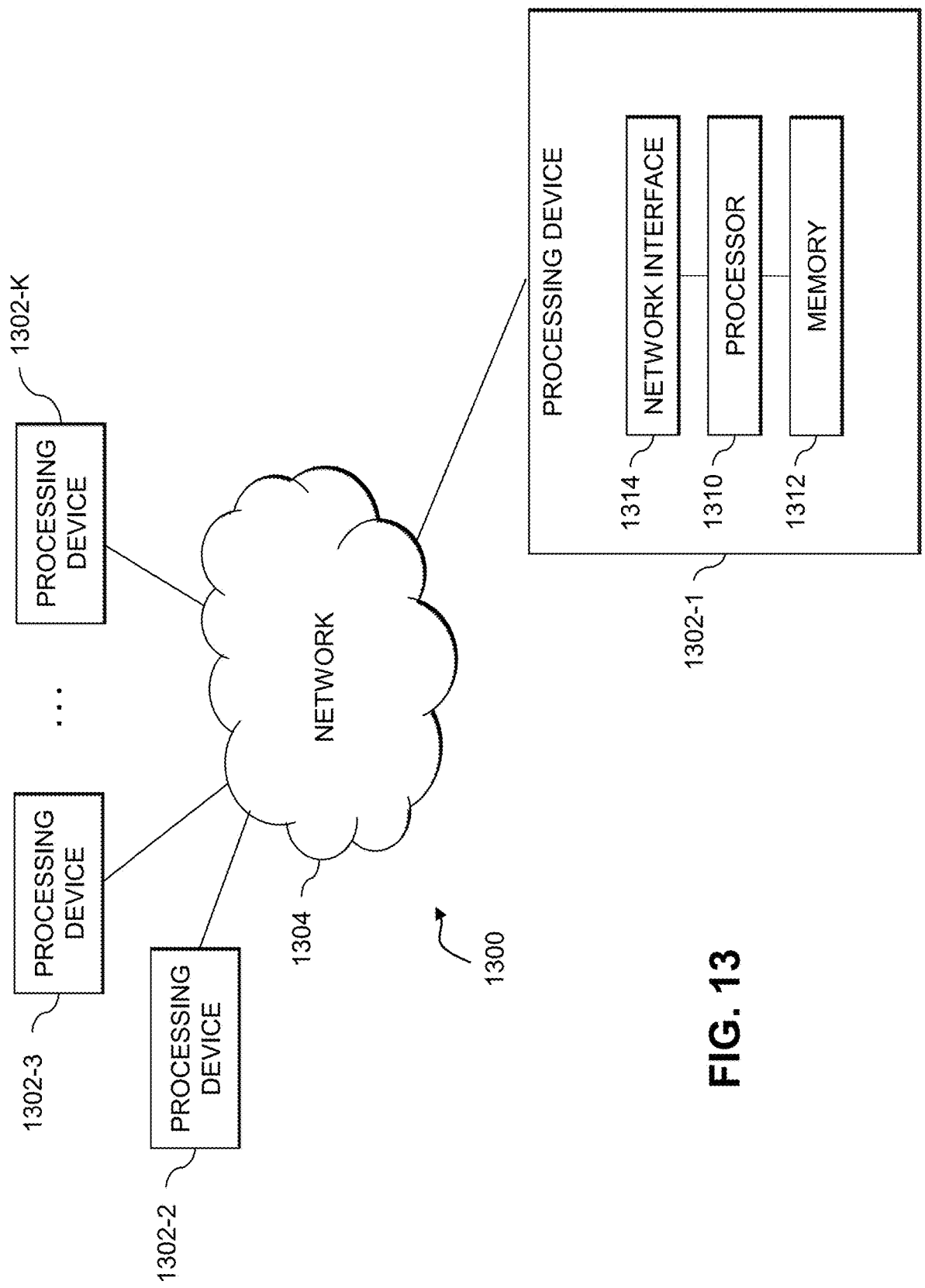

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for proactive replication of software containers using geographic location affinity to predicted clusters in a distributed computing environment as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container platforms, machine learning algorithms, clustering algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   monitoring, over two or more time intervals, client requests to access one or more software container instances each hosted by one or more of a plurality of container host devices of a geographically-distributed software container platform, each of the two or more time intervals comprising two or more time slices;
   generating cluster pattern data for the one or more software container instances, the cluster pattern data comprising one or more geographic clusters of client requests for at least one of the one or more software container instances in at least one of the two or more time slices;
   predicting, for a given one of the two or more time slices in a given time interval subsequent to the two or more time intervals, formation of at least one geographic cluster of client requests for at least one of the one or more software container instances based at least in part on the generated cluster pattern data;
   calculating network distances from the at least one predicted geographic cluster to each of at least a subset of the plurality of container host devices;
   selecting one of the subset of the plurality of container host devices based at least in part on the calculated network distances; and
   proactively replicating the at least one software container instance in the selected container host device prior to the given time slice of the given time interval;
   wherein generating the cluster pattern data comprises generating cluster pattern time series data for the two or more time slices across the two or more time intervals; and
   wherein predicting formation of the at least one geographic cluster for the at least one software container instance based at least in part on the generated cluster pattern data comprises generating, utilizing a neural network model that takes as input the cluster pattern time series data, at least one prediction value indicating a likelihood of cluster formation for the given time slice.

2. The apparatus of claim 1 wherein the geographically-distributed container platform comprises a cloud computing platform.

3. The apparatus of claim 1 wherein monitoring the client requests comprises, for a given client request, obtaining:
   a timestamp of the given client request;
   a container instance identifier; and
   a latitude and longitude of a geographic location of a source application providing the given client request.

4. The apparatus of claim 1 wherein the generated cluster pattern data comprises, for a given one of the one or more geographic clusters associated with a given one of the one or more container instances:
   an identifier of a given one of the two or more time intervals;
   a container instance identifier of the given container instance;
   an identifier of a given one of the two or more time slices; and
   a geographic location of the given geographic cluster.

5. The apparatus of claim 4 wherein the geographic location of the given cluster comprise a cluster midpoint location.

6. The apparatus of claim 1 wherein generating the cluster pattern data comprises identifying the one or more geographic clusters utilizing a machine learning clustering algorithm.

7. The apparatus of claim 6 wherein the machine learning clustering algorithm comprises a K-means clustering algorithm.

8. The apparatus of claim 6 wherein the machine learning clustering algorithm comprises at least one of: a mini-batch K-means clustering algorithm, a hierarchical clustering algorithm, a density-based spatial clustering of application with noise algorithm, and a mean shift clustering algorithm.

9. The apparatus of claim 1 wherein the neural network model comprises a long short term memory neural network model.

10. The apparatus of claim 1 wherein the calculated network distances are based at least in part on geographic distances between the predicted geographic cluster and each of the subset of the plurality of container host devices.

11. The apparatus of claim 10 wherein the calculated network distances are further based at least in part on predictions of available network bandwidth and network latency between the predicted geographic cluster and each of the subset of the plurality of container host devices for the given time slice of the given time interval.

12. The apparatus of claim 1 wherein calculating the network distance from the predicted geographic cluster to each of the subset of the plurality of container host devices comprises utilizing a Haversine distance computation algorithm.

13. The apparatus of claim 1 wherein proactively replicating the at least one software container instance in the selected container host device prior to the given time slice of the given time interval comprises redirecting network traffic from at least one other container host device hosting the at least one software container instance to the selected container host device.

14. A computer program product comprising a non-transitory processor-readable storage medium having stored therein program code of one or more software programs, wherein the program code when executed by at least one processing device causes the at least one processing device to perform steps of:
monitoring, over two or more time intervals, client requests to access one or more software container instances each hosted by one or more of a plurality of container host devices of a geographically-distributed software container platform, each of the two or more time intervals comprising two or more time slices;
generating cluster pattern data for the one or more software container instances, the cluster pattern data comprising one or more geographic clusters of client requests for at least one of the one or more software container instances in at least one of the two or more time slices;
predicting, for a given one of the two or more time slices in a given time interval subsequent to the two or more time intervals, formation of at least one geographic cluster of client requests for at least one of the one or more software container instances based at least in part on the generated cluster pattern data;
calculating network distances from the at least one predicted geographic cluster to each of at least a subset of the plurality of container host devices;
selecting one of the subset of the plurality of container host devices based at least in part on the calculated network distances; and
proactively replicating the at least one software container instance in the selected container host device prior to the given time slice of the given time interval;
wherein generating the cluster pattern data comprises generating cluster pattern time series data for the two or more time slices across the two or more time intervals; and
wherein predicting formation of the at least one geographic cluster for the at least one software container instance based at least in part on the generated cluster pattern data comprises generating, utilizing a neural network model that takes as input the cluster pattern time series data, at least one prediction value indicating a likelihood of cluster formation for the given time slice.

15. The computer program product of claim 14 wherein the neural network model comprises a long short term memory neural network model.

16. A method comprising steps of:
monitoring, over two or more time intervals, client requests to access one or more software container instances each hosted by one or more of a plurality of container host devices of a geographically-distributed software container platform, each of the two or more time intervals comprising two or more time slices;
generating cluster pattern data for the one or more software container instances, the cluster pattern data comprising one or more geographic clusters of client requests for at least one of the one or more software container instances in at least one of the two or more time slices;
predicting, for a given one of the two or more time slices in a given time interval subsequent to the two or more time intervals, formation of at least one geographic cluster of client requests for at least one of the one or more software container instances based at least in part on the generated cluster pattern data;
calculating network distances from the at least one predicted geographic cluster to each of at least a subset of the plurality of container host devices;
selecting one of the subset of the plurality of container host devices based at least in part on the calculated network distances; and
proactively replicating the at least one software container instance in the selected container host device prior to the given time slice of the given time interval;
wherein generating the cluster pattern data comprises generating cluster pattern time series data for the two or more time slices across the two or more time intervals; and
wherein predicting formation of the at least one geographic cluster for the at least one software container instance based at least in part on the generated cluster pattern data comprises generating, utilizing a neural network model that takes as input the cluster pattern time series data, at least one prediction value indicating a likelihood of cluster formation for the given time slice; and
wherein the method is performed by at least one processing device comprising a processor coupled to a memory.

17. The method of claim 16 wherein the neural network model comprises a long short term memory neural network model.

18. The apparatus of claim 9 wherein the long short term memory neural network model comprises a cell state providing long term memory and a hidden state providing short term memory, wherein the hidden state and the cluster pattern time series data are applied to an activation function to produce a first output, wherein a forget filter is applied to the cell state to produce a second output, and wherein the first output and the second output are combined to generate the at least one prediction value indicating the likelihood of cluster formation for the given time slice.

19. The computer program product of claim 15 wherein the long short term memory neural network model comprises a cell state providing long term memory and a hidden state providing short term memory, wherein the hidden state and the cluster pattern time series data are applied to an activation function to produce a first output, wherein a forget filter is applied to the cell state to produce a second output, and wherein the first output and the second output are combined to generate the at least one prediction value indicating the likelihood of cluster formation for the given time slice.

20. The method of claim 17 wherein the long short term memory neural network model comprises a cell state providing long term memory and a hidden state providing short term memory, wherein the hidden state and the cluster pattern time series data are applied to an activation function to produce a first output, wherein a forget filter is applied to the cell state to produce a second output, and wherein the first output and the second output are combined to generate the at least one prediction value indicating the likelihood of cluster formation for the given time slice.

* * * * *